US012691890B2

(12) United States Patent
Saito et al.

(10) Patent No.: US 12,691,890 B2
(45) Date of Patent: Jul. 28, 2026

(54) MOBILE-BODY CONTROL SYSTEM

(71) Applicant: Mitsubishi Electric Corporation,
Tokyo (JP)

(72) Inventors: Tomokazu Saito, Tokyo (JP); Yuta Wada, Tokyo (JP)

(73) Assignee: Mitsubishi Electric Corporation,
Tokyo (JP)

( * ) Notice: Subject to any disclaimer, the term of this patent is extended or adjusted under 35 U.S.C. 154(b) by 88 days.

(21) Appl. No.: 18/426,883

(22) Filed: Jan. 30, 2024

(65) Prior Publication Data

US 2025/0136127 A1 May 1, 2025

(30) Foreign Application Priority Data

Oct. 25, 2023 (JP) ................................. 2023-182996

(51) Int. Cl.
*B60W 50/029* (2012.01)
*B60W 60/00* (2020.01)

(52) U.S. Cl.
CPC ........ *B60W 50/029* (2013.01); *B60W 60/001* (2020.02); *B60W 2050/0292* (2013.01)

(58) Field of Classification Search
CPC ............ B60W 50/029; B60W 60/001; B60W 2050/0292
USPC .......................................................... 701/23
See application file for complete search history.

(56) References Cited

U.S. PATENT DOCUMENTS

| | | | | |
|---|---|---|---|---|
| 9,523,984 B1 * | 12/2016 | Herbach | ............... | B60W 10/18 |
| 2020/0142430 A1 * | 5/2020 | Harvey | ................ | G05D 1/0297 |
| 2024/0092360 A1 * | 3/2024 | Niizeki | ............ | B60W 30/0956 |
| 2024/0124018 A1 * | 4/2024 | Hokai | ............... | B60W 60/0015 |

FOREIGN PATENT DOCUMENTS

JP        7091827 B2      6/2022

* cited by examiner

*Primary Examiner* — Muhammad Shafi
(74) *Attorney, Agent, or Firm* — Sughrue Mion, PLLC

(57) ABSTRACT

In a management apparatus, a mobile-body control system has an instruction unit that transmits a command of making a vehicle move to a waiting state from automatic driving; in the case where a state-transition determination unit determines that a state of the vehicle satisfies a predetermined condition and the vehicle receives the foregoing command from the management apparatus, the vehicle is made to move to the waiting state by a state-transition execution unit, so that loss in the function of a battery is suppressed.

20 Claims, 8 Drawing Sheets

| TRANSITION CONDITION / OPERATION STATE | E POWER ON | F RECEPTION OF MANUAL-DRIVING COMMAND | G WAITING STATE HAS ELAPSED PREDETERMINED TIME | H RECEPTION OF AUTOMATIC-DRIVING COMMAND | Q RECEPTION OF WAITING COMMAND |
|---|---|---|---|---|---|
| A POWER OFF (INITIAL STATE) | J WAITING | — | — | — | — |
| B WAITING | — | K MANUAL DRIVING | M AUTOMATIC DRIVING | N AUTOMATIC DRIVING | — |
| C MANUAL DRIVING | — | L MANUAL DRIVING | — | O AUTOMATIC DRIVING | — |
| D AUTOMATIC DRIVING | — | — | — | — | P WAITING |

FIG. 4

| ID | OPERATION STATE | REQUEST-MESSAGE TRANSMISSION CONDITION |
|---|---|---|
| 1 | WAITING | REMAINING CHARGE AMOUNT OF BATTERY IS 20% OR SMALLER |
| 2 | WAITING | WORKING TIME IN NEXT TRANSPORT INSTRUCTION IS 2 HRS. OR LONGER |
| 3 | WAITING | 10 MIN. HAS ELAPSED FROM THE LAST EXECUTED AUTOMATIC-DRIVING OPERATION |

MOBILE-BODY CONTROL SYSTEM

BACKGROUND OF THE INVENTION

Field of the Invention

The present disclosure relates to a mobile-body control system.

Description of the Related Art in recent years, because of the progress of technologies such as automatic driving and remote operation, vehicles, as mobile bodies, such as an unmanned-operation-feasible electric carriage and an unmanned-operation-feasible fork-lift have been developed, and a mobile-body control system provided with a control apparatus for issuing operational commands to the foregoing vehicle has been studied. In such a mobile-body control system, when an abnormality occurs in a vehicle as a mobile body, it is required that the abnormality is notified to a control apparatus so as to cope with the abnormality in the vehicle.

To date, there has been disclosed an apparatus that predicts the feasibility of continuing automatic driving, based on the state of a battery as a power source mounted in an automatic driving vehicle, in the case where during driving the vehicle, an abnormality occurs in the vehicle, and that notifies the abnormality of the own vehicle to a vehicle as another mobile body around the own vehicle, before the function of the battery is completely lost (e.g., refer to Patent Document 1).

PRIOR ART REFERENCE

Patent Document

[Patent Document 1] Japanese Patent No. 7091827

SUMMARY OF THE INVENTION

In a conventional apparatus disclosed in Patent Document 1, an abnormality in an automatic driving vehicle, which is the own vehicle, is coped with by notifying other vehicles therearound of the abnormality; it is not taken into account to suppress the function of the battery in the automatic driving vehicle from being lost. Accordingly, in the case where the function of the battery in the automatic driving vehicle continues to be deteriorated, the function of the own vehicle that is required to cope with the abnormality may not be secured.

The present disclosure is to disclose a technology for solving the foregoing problem; the objective thereof is to provide a mobile-body control system that transits the state of an automatic-driving-feasible mobile body to the waiting state, in the case where an abnormality in the mobile body is detected, so as to realize prevention of the function loss of the mobile-body battery.

A mobile-body control system according to the present disclosure includes a mobile body that is configured in such a way as to be able to travel through automatic driving and a management apparatus that controls the mobile body by mutually communicating with the mobile body; the mobile-body control system is characterized in that the management apparatus has an instruction unit that transmits to the mobile body a command for making the mobile body move to a waiting state from the automatic driving, via the communication, in that the mobile body has a storage unit that stores a condition for transition to the waiting state, a state-transition determination unit that determines whether or not the mobile body satisfies the condition, and a state-transition execution unit that makes the mobile body move to the waiting state, and in that in the case where the state-transition determination unit determines that a state of the mobile body satisfies the condition and the mobile body receives the command from the management apparatus, the state-transition execution unit makes the mobile body move to the waiting state.

In addition, a mobile-body control system according to the present disclosure includes a mobile body that is configured in such a way as to be able to travel through automatic driving and a management apparatus that controls the mobile body by mutually communicating with the mobile body; the mobile-body control system is characterized in that the management apparatus has a communication unit inside the management apparatus and an instruction unit that is mutually communicatably connected with the communication unit inside the management apparatus via a communication path, in that the mobile body has a communication unit inside the mobile body mutually communicatably connected with the communication unit in the management apparatus, a storage unit that stores a condition for the mobile body to move to a waiting state, a state-transition determination unit that determines whether or not the mobile body satisfies the condition, and a state-transition execution unit that makes the mobile body move to the waiting state, in that the communication unit inside the mobile body, the storage unit, the state-transition determination unit, and the state-transition execution unit are communicatably connected with one another via a communication path, in that when determining that a state of the mobile body satisfies the condition stored in the storage unit, the state-transition determination unit transmits to the management apparatus a request message for requesting transmission of a command of instructing transition to the waiting state, via the communication path inside the mobile body and the communication path inside the management apparatus, in that in response to the request message, the instruction unit transmits a response message including the command to the mobile body, via the communication path inside the management apparatus and the communication path inside the mobile body, and in that based on the command included in the response message, the state-transition execution unit makes the mobile body move to the waiting state.

The present disclosure make it possible to obtain a mobile-body control system that transits the state of an automatic-driving-feasible mobile body to the waiting state, in the case where an abnormality in the mobile body is detected, so as to realize prevention of the function loss of the mobile-body battery.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2 is a configuration diagram representing the configuration of a vehicle in the mobile-body control system according to Embodiment 1;

FIG. 3 is an explanatory table representing state transition of the vehicle in the mobile-body control system according to Embodiment 1;

FIG. 4 is an explanatory table representing transmission conditions for the vehicle to transmit request messages to a management apparatus in the mobile-body control system according to Embodiment 1;

DETAILED DESCRIPTION OF THE PREFERRED EMBODIMENTS

Figure 1:
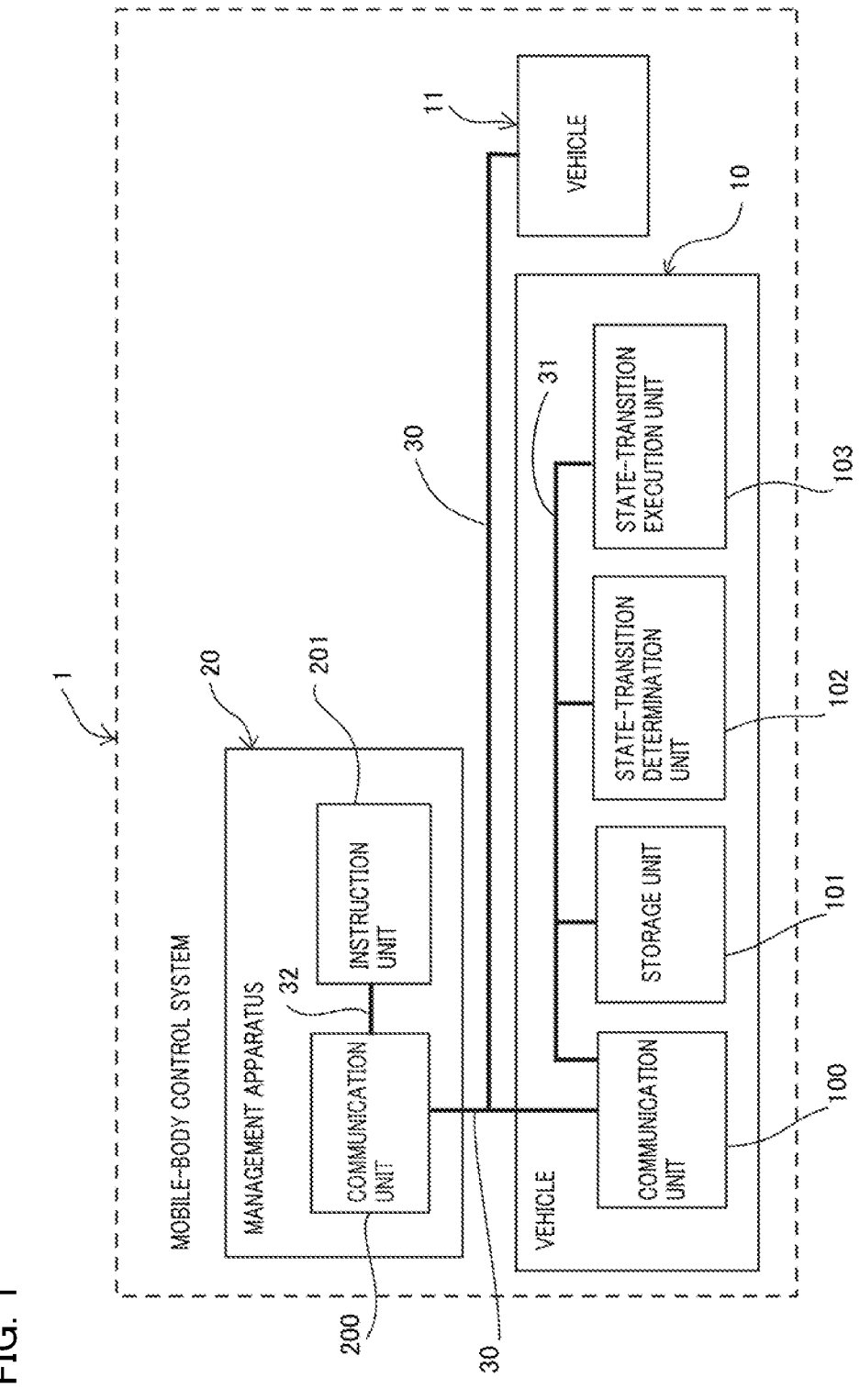
FIG. 1 is a configuration diagram representing the configuration of a mobile-body control system according to Embodiment 1.

Hereinafter, a mobile-body control system according to the present disclosure will be explained by use of the drawings. In each of the drawings, the same reference characters denote the same or similar portions.

Embodiment 1

A mobile-body control system according to Embodiment 1 has a vehicle as a mobile body that includes a trailer and a trailer head for towing the trailer and is configured in such a way as to be able to automatically driven (hereinafter, referred to simply as a vehicle); there is represented an example in which the mobile-body control system is applied to a truck transport system where the vehicle transports goods or the like, while moving among two or more transport bases by automatic driving.

Figure 2:
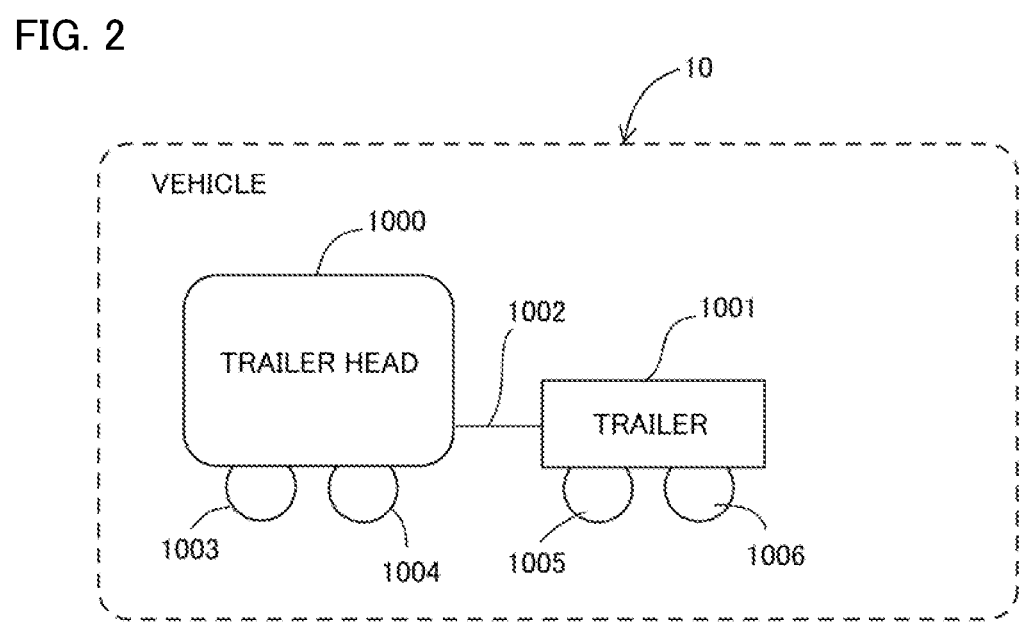

FIG. 1 is a configuration diagram representing the configuration of the mobile-body control system according to Embodiment 1; FIG. 2 is a configuration diagram representing the configuration of the vehicle in the mobile-body control system according to Embodiment 1. In FIG. 1, the mobile-body control system 1 includes two vehicles 10 and 11 and a management apparatus 20 configured in such a way as to mutually communicate with the vehicles 10 and 11. Each of the vehicles 10 and 11 is configured to be able to perform automatic driving. The management apparatus 20 is disposed in a direction center or an administration building provided outside the vehicles 10 and 11.

In addition, although in the mobile-body control system according to Embodiment 1, there is represented an example in which the two automatic-driving-feasible vehicles 10 and 11 are provided, the number of vehicles to be included in the mobile-body control system 1 is not limited to 2; one vehicle or three or more vehicles may be included.

In the following explanation, a message that is transmitted from each of the vehicles 10 and 11 to the management apparatus 20 and requests the management apparatus 20 to transmit a command to the own vehicle will be referred to as a "request message", and a message that is transmitted from the management apparatus 20 to each of the vehicles 10 and 11 in response to the request message and includes a command from the management apparatus 20 to each of the vehicles 10 and 11 will be referred to as a "response message".

In the mobile-body control system according to Embodiment 1, the vehicle 10 as a mobile body is a vehicle provided with an automatic-driving-feasible trailer head. As illustrated in FIG. 2, the vehicle 10 includes a trailer head 1000 and a trailer 1001.

The trailer head 1000 is provided with a front-wheel unit 1003 including a pair of left and right wheels for travelling on a road or on a floor (both are unillustrated), a rear-wheel unit 1004 including a pair of left and right wheels, a driving apparatus (unillustrated) including a motor and the like for driving at least one of the front-wheel unit 1003 and the rear-wheel unit 1004, and a steering apparatus (unillustrated) that steers at least one of the front-wheel unit 1003 and the rear-wheel unit 1004.

The trailer 1001 is coupled with the trailer head 1000 through the intermediary of a coupling member 1002 and is configured in such a way that goods (unillustrated) can be loaded thereon. The trailer 1001 is provided with a front-wheel unit 1005 including a pair of left and right wheels for travelling on a road or on a floor and a rear-wheel unit 1006 including a pair of left and right wheels.

In addition, each of the vehicles 10 and 11 may be a single trailer head, a forklift, or an automobile for transporting humans.

In FIG. 1, the vehicle 10 is provided with a communication unit 100 inside the vehicle, a storage unit 101, a state-transition determination unit 102, and a state-transition execution unit 103. The communication unit 100, the storage unit 101, the state-transition determination unit 102, and the state-transition execution unit 103 can transmit and receive data with one another via a communication path 31. In this situation, the communication path 31 is formed of, for example, a LAN (Local Area Network) provided in the vehicle 10. The vehicle 11 is configured in the same manner as the vehicle 10.

The management apparatus 20 is provided with a communication unit 200 inside the management apparatus and an instruction unit 201. The communication unit 200 and the instruction unit 201 can transmit and receive data with each other, via communication path 32 provided in the management apparatus 20. In this situation, the communication path 32 is formed of, for example, a LAN (Local Area Network) provided in the management apparatus.

Figure 8:
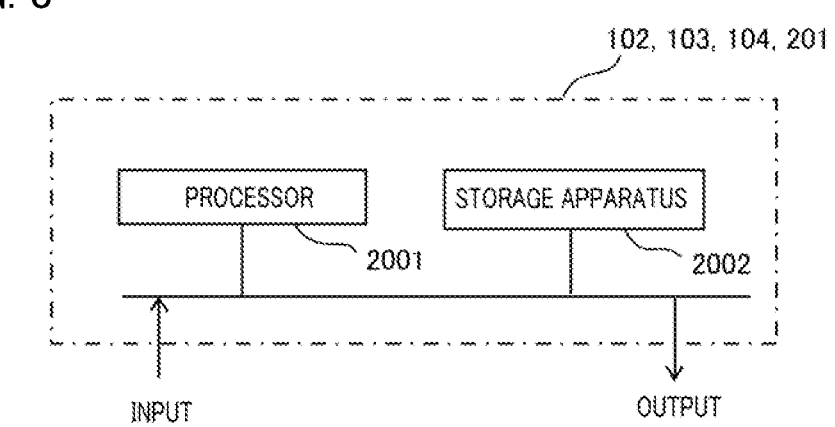
FIG. 8 is a block diagram representing an example of the hardware configuration of each of a state transition unit, a state-transition execution unit, a waiting-place selection unit, and an instruction unit in each of mobile-body control systems according to Embodiments 1 and 2.

FIG. 8 is a block diagram representing an example of the hardware configuration of each of a state-transition determination unit, a state-transition execution unit, a waiting-place selection unit, and an instruction unit in each of mobile-body control systems according to Embodiments 1 and 2. In addition, the waiting-place selection unit will be explained in the mobile-body control system according to Embodiment 2. Each of the state-transition determination unit 102, the state-transition execution unit 103, and an after-mentioned waiting-place selection unit 104, which are provided in the foregoing vehicle 10, and the instruction unit 201 provided in the management apparatus 20 has a hardware configuration, for example, represented in FIG. 8.

In other words, in FIG. 8, each of the state-transition determination unit 102, the state-transition execution unit 103, the after-mentioned waiting-place selection unit 104, described above, and the instruction unit 201 provided in the management apparatus 20 includes a processor 2001 and a storage apparatus 2002. Although not illustrated, the storage apparatus 2002 has a volatile storage device such as a random access memory and a nonvolatile auxiliary storage device such as a flash memory.

Each of the state-transition determination unit 102, the state-transition execution unit 103, the after-mentioned waiting-place selection unit 104, and the instruction unit 201 provided in the management apparatus 20 executes a program inputted from the storage apparatus 2002. In this case, the program is inputted from the auxiliary storage device to the processor 2001 by way of the volatile storage device. Moreover, the processor 2001 may either output data such as a calculation result to the volatile storage device of the storage apparatus 2002 or store the data in the auxiliary storage device by way of the volatile storage device. In addition, the state-transition determination unit 102, the state-transition execution unit 103, and the after-mentioned waiting-place selection unit 104 may be an integrated unit or separated units.

In FIG. 1, the communication unit 100 provided inside the vehicle 10 and the communication unit 200 provided inside the management apparatus 20 can transmit and receive data with each other, via the communication path 30. In addition, by means of the communication unit 100 provided inside the vehicle 10 and the communication unit (unillustrated) provided inside the vehicle 11, the vehicle 10 and the vehicle 11 can transmit and receive data with each other, via the communication path 30. In this situation, each of the communication path 30 between the management apparatus 20 and the vehicles 10 and 11 and the communication path 30 between the vehicle 10 and the vehicle 11 may be either a wired communication path or a wireless communication path.

Each of the data transmission and reception, performed via the communication path 30, between the management apparatus 20 and the vehicles 10 and 11, the data transmission and reception, performed via the communication path 30, between the vehicle 10 and the vehicle 11, and the data transmission and reception, performed via the communication path 31, inside each of the vehicles 10 and 11 is carried out through serial communication utilizing a CAN (Controller Area Network).

Next, the configuration of the vehicle 10 will be explained further in detail. In FIG. 1, the communication unit 100 inside the vehicle transmits an after-mentioned request message to the communication unit 200 inside the management apparatus 20. Moreover, after transmitting the request message to the communication unit 200 inside the management apparatus, the communication unit 100 receives an after-mentioned response message, as a response to the request message, from the communication unit 200 inside the management apparatus.

In the present embodiment, the "waiting state" of a vehicle denotes a vehicle state where functions other than that for communicating with the management apparatus are stopped so as to suppress power consumption in the loads on the battery. The functions other than that for communicating with the management apparatus may be, for example, either the functions as an air conditioner and an audio apparatus or the functions of a driving apparatus for driving the vehicle, a steering apparatus, a control apparatus, and the like.

The storage unit 101 stores the following data items.

(1) Two or more operation states that can be taken by the vehicle 10

(2) Transition conditions for the vehicle 10 to move from a certain operation state to another operation state (3) Request-message transmission conditions for transmitting a request message from the vehicle 10 to the management apparatus 20

Next, the relationship between "two or more operation states that can be taken by the vehicle 10" in foregoing (1) and "transition conditions for the vehicle 10 to move from a certain operation state to another operation state" in foregoing (2), stored in the storage unit 101, will be explained. FIG. 3 is an explanatory table representing state transition of the vehicle in the mobile-body control system according to Embodiment 1; FIG. 4 is an explanatory table representing request-message transmission conditions for the vehicle to transmit request messages to the management apparatus in the mobile-body control system according to Embodiment 1.

In the mobile-body control system according to Embodiment 1, as the operation states of the vehicle 10, stored in the storage unit 101 of the vehicle 10, there exist four operation states, i.e., "power off" A, "waiting" B, "manual driving" C, and "automatic driving" D. In addition, as the transition conditions for the vehicle 10 to move to a specific operation state, there exist five transition conditions, i.e., "power on" E, "reception of manual-driving command" F, "waiting condition has elapsed a predetermined time" G, "reception of automatic-driving command" H, and "reception of waiting command" Q.

In the initial state of the vehicle 10, the vehicle 10 is in the operation state of "power off" A represented in FIG. 3. In the case where when the vehicle 10 is in the operation state of "power off" A, "power on" E, as a transition condition, is executed, i.e., the power switch (unillustrated) provided in the vehicle 10 is pressed so as to turn on the power, the vehicle 10 moves to the waiting state J.

Moreover, in the case where when the vehicle 10 is in the "waiting state" B, "reception of manual-driving command" F is satisfied by receiving a manual-driving command from the management apparatus 20, the vehicle 10 moves to a state of "manual driving" K. Furthermore, when the "waiting state" B elapses a predetermined time so that the transition condition of "waiting condition has elapsed a predetermined time" G is satisfied, the vehicle 10 moves to a state of "automatic driving" M.

In addition, in the case where when the vehicle 10 is in the state of "waiting" B, the vehicle 10 receives a command of automatic driving from the management apparatus 20 and hence the transition condition of "reception of automatic-driving command" H is satisfied, the vehicle 10 moves to a state of "automatic driving" N. Moreover, in the case where when the vehicle 10 is in the state of "manual driving" C, the vehicle 10 receives the command of automatic driving from the management apparatus 20 and hence the transition condition indicated by "reception of automatic-driving command" H is satisfied, the vehicle 10 moves to a state of "automatic driving" O.

In addition, in the case where when the vehicle 10 is in the state of "automatic driving" D, the vehicle 10 receives the manual-driving command from the management apparatus 20 and hence the transition condition of "reception of manual-driving command" F is satisfied, the vehicle 10 moves to a state of "manual driving" L; moreover, in the case where when the vehicle 10 is in the state of "automatic driving" D, the vehicle 10 receives a command of waiting from the management apparatus 20 and hence the transition condition indicated by "reception of waiting command" Q is satisfied, the vehicle 10 moves to a state of "waiting" P.

In addition, "-" represented in FIG. 3 suggests that even when each of the transition conditions indicated by E, F, G, H, and I is satisfied, the operation state to which the vehicle 10 can move from each of the operation states indicated by A, B, C, and D does not exist.

Next, an example of "request-message transmission conditions for transmitting a request message from the vehicle 10 to the management apparatus 20" in foregoing (3) stored in the storage unit 101 will be explained. In FIG. 4, "ID 1", "ID 2", and "ID 3" indicate the respective identification numbers of the request-message transmission conditions. In addition, "operation state" indicates the kind of the operation state of the vehicle in the transition destination; "request-message transmission condition" indicates a transmission condition for transmitting a request message from the vehicle 10 to the management apparatus 20.

In FIG. 4, the transmission condition indicated by the identification number ID1 is that the remaining charge amount of the battery provided in the vehicle 10 has decreased to "20%" or smaller. The transmission condition indicated by the identification number ID2 is that the working time of the next transfer instruction is "2 hours" or longer; the reason why this is a waiting condition is that in the case where the working time related to the next transfer instruction is long and a lot of electric power is liable to be consumed, it is required that sufficient electric power of the battery is secured. In the case where it is presumed that the power consumption during the next working time is large, the present operation of the vehicle 10 as a mobile body is temporarily stopped so that the vehicle 10 moves to the waiting state so as to save the electric power. Accordingly, no power shortage occurs during the next work and hence the work can be completed; thus, operation of the vehicle 10 as a mobile body can efficiently be performed. That is to say, the transmission condition indicated by the identification number ID2 is that for efficiently performing the operation of the vehicle 10 as a mobile body, the vehicle 10 as a mobile body is moved to the waiting state. The transmission condition indicated by the identification number ID1 is that "10 minutes" have elapsed after immediately previous automatic driving operation that had been performed by the vehicle 10.

In addition, in FIG. 4, the conditions for transmitting the request message for moving to the waiting state are represented; also with regard to the manual-driving state and the automatic-driving state, conditions for transmitting the request message may separately be set; alternatively, the state may be changed based on a message received from the management apparatus 20, without transmitting the request message.

In FIG. 1, the state-transition determination unit 102 in the vehicle 10 determines whether or not data obtained from a sensor (unillustrated) provided in the vehicle 10, the execution situation of a transfer instruction from the management apparatus 20, or the like satisfies the request-message transmission condition represented in foregoing FIG. 4; in the case where the foregoing condition is satisfied, the state-transition determination unit 102 creates a request message including the contents saying that state transition is required, in accordance with a communication format that enables transmission to the management apparatus 20, for example, a serial-communication format based on a CAN, and then transmits the request message to the communication unit 200 inside the management apparatus 20, byway of the communication unit 100 inside the vehicle.

In the mobile-body control system according to Embodiment 1, each of the request-message transmission conditions represented in FIG. 4 corresponds to a condition with which the state-transition determination unit 102 determines the state of the vehicle 10 as a mobile body. The state-transition determination unit 102 determines whether or not at least one of the request-message transmission conditions represented in FIG. 4 is satisfied by the state of the vehicle 10.

When from the management apparatus 20, the vehicle 10 receives a response message in response to a request message transmitted from the vehicle 10 to the management apparatus 20, the state-transition execution unit 103 makes the driving state of the vehicle 10 to move to the driving state designated by the foregoing response message. For example, in the case where the vehicle 10 is in the automatic-driving state and the contents of the response message is a command of transition to the waiting state, the state-transition execution unit 103 of the vehicle 10 changes the operation state of the vehicle 10 from the automatic-driving state to the waiting state. As a result, the vehicle 10 stops the automatic-driving operation at the present place and moves to the waiting state. The vehicle 10 is configured in such a way as to perform, in the waiting state, the operation of suppressing the battery mounted in the vehicle 10 from losing its function.

In addition, in the case where the vehicle 10 is in the automatic-driving state and the contents of the response message rejects the request of the request message, the state-transition execution unit 103 of the vehicle 10 continues the automatic-driving state, without changing the operation states. Moreover, when receiving a message of cancelling the waiting state from the management apparatus 20, the state-transition execution unit 103 cancels the waiting state and makes the state move to another operation state.

In addition, in the case where after a request message is transmitted from the vehicle 10 to the management apparatus 20, the vehicle 10 receives a response message from the management apparatus 20, the vehicle 10 may continue its traveling until the state-transition execution unit 103 completes its processing, may stop its traveling at the present place in order to suppress the battery from losing the function thereof, or may accept no new transport command.

Moreover, the vehicle 10 may be configured in such a way that in the case where when being in the waiting state, the vehicle 10 does not satisfy any of the request-message transmission conditions represented in foregoing FIG. 4, the vehicle 10 moves from the waiting state to another state. Moreover, the vehicle 10 may be configured in such a way as to keep the operation state at a time before the transition to the waiting state, until the transition to the waiting state is completed.

Next, the management apparatus 20 will be explained. In FIG. 1, the management apparatus 20 is an apparatus that can communicate with the vehicle 10 via the communication path 30 and is provided with the communication unit 200 and the instruction unit 201 inside the management apparatus. The communication unit 200 and the instruction unit 201 inside the management apparatus are configured in such a way as to be connected with the communication path 32 such as a local LAN provided inside the management apparatus 20 and in such a way as to be able to communicate with each other via the communication path 32.

The management apparatus 20 may be either a mobile terminal to be utilized in business or a monitoring terminal provided in a control room for monitoring the operation of the vehicle 10.

The communication unit 200 is configured in such a way as to be able to mutually communicate with the respective communication units 100 provided inside the vehicle 10 and 11, via the communication path 30. For example, the communication unit 200 inside the management apparatus can receive a request message from the communication unit 100 inside the vehicle and can transmit a response message, sent from the instruction unit 201 via the communication path 32, to the respective communication units 100 provided inside the vehicle 10 and 11.

The instruction unit 201 creates a response message including the contents of a command for issuing an instruction to the vehicle 10 and then transmits the response message to the communication unit 100 of the vehicle 10 via the communication unit 200. For example, in the case where when a request message received from the vehicle 10 requires transition from the automatic-driving state to the waiting state, a worker possessing the management apparatus 20 inputs a command of permitting the foregoing requirement from the vehicle 10, the instruction unit 201 creates a response message, based on a format, such as a serial-communication format based on a CAN, that enables the contents of a command of instructing transition to the waiting state to be transmitted to the vehicle 10, and then transmits the response message to the communication unit 200 inside the management apparatus via the communication path 32.

In addition, the configuration of the instruction unit 201 is not limited to the foregoing configuration; for example, it may be allowed that a worker preliminarily inputs to the management apparatus 20 a command saying that at a predetermined time point, the vehicle 10 starts automatic-driving operation, and then the instruction unit 201 creates a message including the inputted contents. Moreover, it may be allowed that the instruction unit 201 creates a message based on not only the inputting by a worker but also the contents of a program provided in the management apparatus 20.

Figure 5:
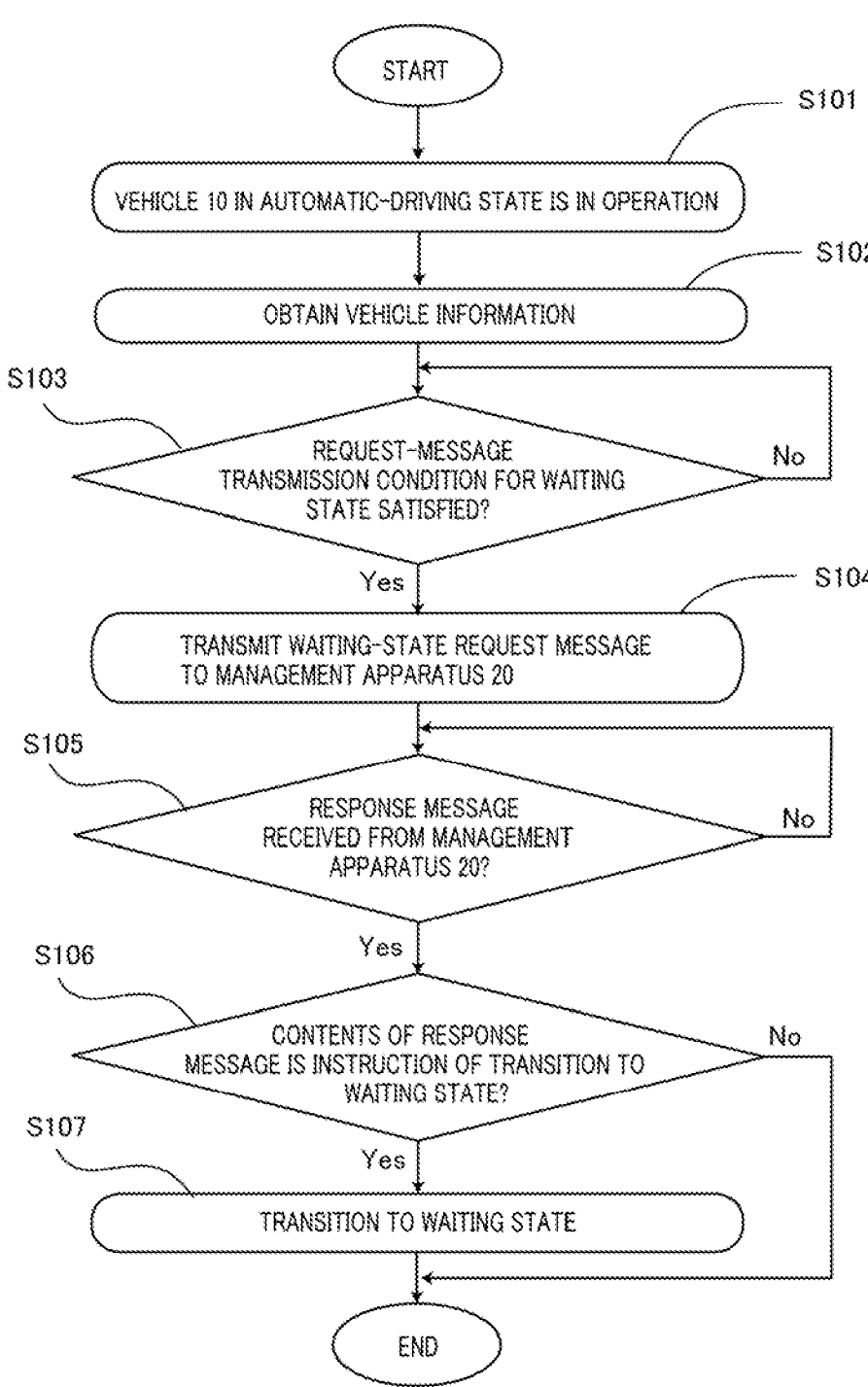
FIG. 5 is a flowchart representing operation of the vehicle in the mobile-body control system according to Embodiment 1.

Next, the operation of the mobile-body control system, configured as described above, according to Embodiment 1 will be explained. FIG. 5 is a flowchart representing operation of a vehicle in the mobile-body control system according to Embodiment 1; FIG. 5 represents the operation in which the vehicle 10 moves from the automatic-driving state to the waiting state. In FIG. 5, in the step S101, the vehicle 10 is operating in the automatic-driving state. In the step S102, the vehicle 10 in the automatic-driving state obtains its own vehicle information from data obtained from a sensor or the like provided in the vehicle 10, the execution situation of a transfer instruction from the management apparatus 20, or the like.

Next, in the step S103, the state-transition determination unit 102 of the vehicle 10 determines whether or not the condition for the vehicle to transmit a request message for the waiting state from the automatic-driving state is satisfied. The operation state from which the vehicle 10 in the automatic-driving state can perform state transition is the manual-driving state indicated by L in FIG. 3 or the waiting state indicated by P; in the present embodiment, it is assumed that the state transition to the waiting state indicated by P in FIG. 3 is requested, and in the step S103, the state-transition determination unit 102 determines whether or not the request-message transmission condition for the vehicle 10 to request the transition to the waiting state is satisfied.

The condition for the vehicle 10 in the automatic-driving state to be able to transmit a request message for requesting the transition to the waiting state is that at least one of the conditions of the identification number ID1, the identification number ID2, and the identification number ID3, represented in FIG. 4, stored in the storage unit 101 of the vehicle 10 is satisfied. Accordingly, the state-transition determination unit 102 of the vehicle 10 compares the request-message transmission condition stored in the storage unit 101 with the driving information on the vehicle 10, obtained in the step S102, and then determines whether or not the vehicle 10 satisfies at least one of the transmission conditions of the identification number ID1, the identification number ID2, and the identification number ID3.

In the case where it is determined in the step S103 that the vehicle 10 satisfies the request-message transmission condition (Yes), the step S103 is followed by the step S104; in the case where it is determined that the vehicle 10 does not satisfy the foregoing transmission condition (No), the step S103 is resumed and then the foregoing determination is repeated.

In the step S104, the state-transition determination unit 102 of the vehicle 10 creates a request message including the contents saying that state transition is required, in accordance with a communication format that enables transmission to the management apparatus 20, for example, a serial-communication format based on a CAN, and then transmits the request message to the communication unit 200 of the management apparatus 20 via the communication unit 100; then, the step S104 is followed by the step S105.

In the step S105, the state-transition execution unit 103 determines whether or not the vehicle 10 has received a response message from the management apparatus 20, in response to the request message transmitted from the vehicle 10 to the management apparatus 20. In the case where it is determined in the step S105 that the vehicle 10 has received a response message from the management apparatus 20 (Yes), the step S105 is followed by the step S106; in the case where it is determined that the vehicle 10 has not received a response message from the management apparatus 20 (No), the step S105 is resumed and then the foregoing determination is repeated.

In the step S106, the state-transition execution unit 103 determines whether or not the contents of the received response message is a command of instructing the transition to the waiting state; in the case where the contents of the received response message is a command of instructing the transition to the waiting state (Yes), the step S106 is followed by the step S107, where the state-transition execution unit 103 executes the transition of the vehicle 10 from the automatic-driving state to the waiting state. As a result, the vehicle 10 stops the automatic-driving operation at the present place and moves to the waiting state.

In the case where it is determined in the step S106 that the contents of the received response message is not a command of instructing the transition to the waiting state (No), the processing in FIG. 5 is ended.

The foregoing mobile-body control system according to Embodiment 1 makes it possible to obtain an effect that the loss in the function of the battery of the vehicle 10 can be suppressed.

Embodiment 2

Figure 6:
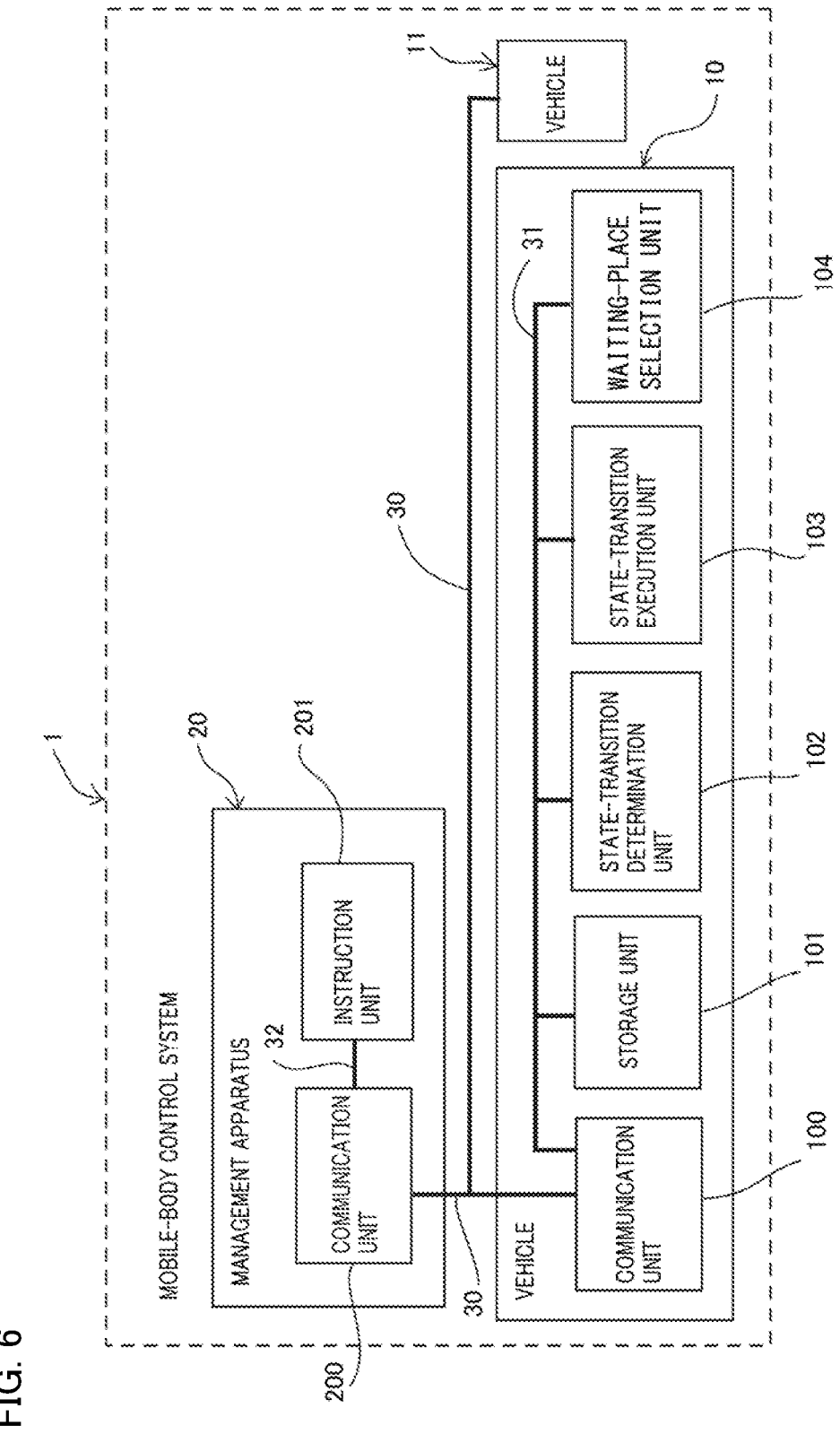
FIG. 6 is a configuration diagram representing the configuration of a mobile-body control system according to Embodiment 2.

Next, a mobile-body control system according to Embodiment 2 will be explained. FIG. 6 is a configuration diagram representing the configuration of the mobile-body control system according to Embodiment 2. The mobile-body control system according to Embodiment 2 represented in FIG. 6 is different from the mobile-body control system according to Embodiment 1 in that the vehicle as a mobile body has a waiting-place selection unit. In the following explanation, the difference from the mobile-body control system according to Embodiment 1 will mainly be explained.

In FIG. 6, the vehicle 10 as a mobile body is provided with the communication unit 100 inside the vehicle, the storage unit 101, the state-transition determination unit 102, the state-transition execution unit 103, and the waiting-place selection unit 104. In the case where the contents of the response message received from the management apparatus 20 instructs the transition to the waiting state, the waiting-place selection unit 104 selects a place where the vehicle 10 should wait and determines the transition of the vehicle 10 to the waiting place.

For example, the reason why the vehicle 10 has transmitted a request message to the management apparatus 20 is that the remaining charge amount of the battery is the same as or smaller than "20%", as indicated by the identification number ID1 in FIG. 4, the waiting-place selection unit 104 selects "charging facility" as a waiting place and notify a worker for the vehicle 10 of a message urging charging operation. Based on the determination by the waiting-place selection unit 104, the vehicle 10 moves to the foregoing charging facility. After arriving at the charging facility, the vehicle 10 manually or automatically stops part of the power sources and waits for the worker for the vehicle 10 to start charging operation.

In addition, the operation by the vehicle 10, such as battery-charging work, performed in the waiting place may be determined based on the request-message transmission condition represented in FIG. 4; in addition to that, it may be allowed that the management apparatus 20 instructs the contents of the work by including the contents in a response message and then the vehicle automatically perform or the worker perform the work in accordance with the instructed contents; alternatively, the worker may independently determine the work.

Figure 7:
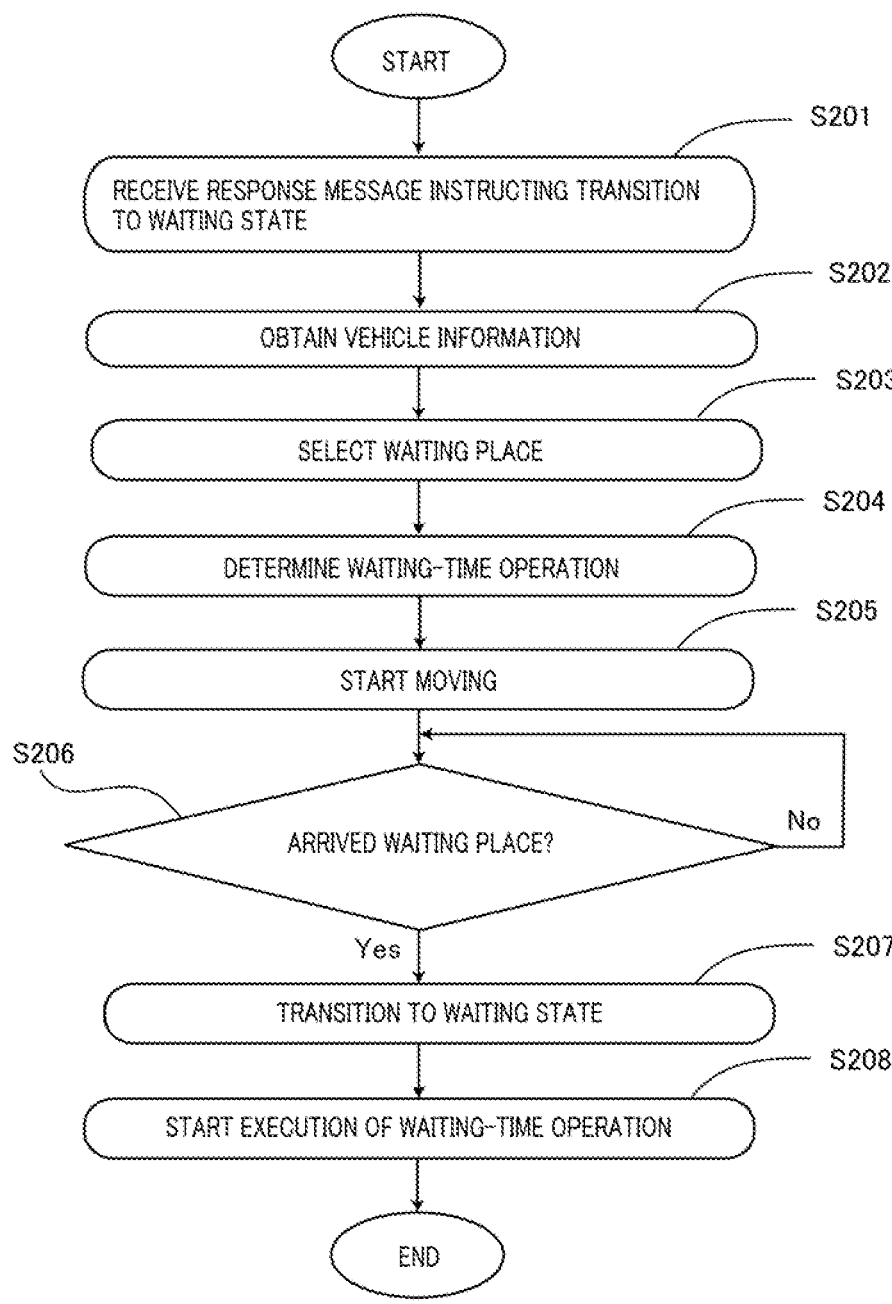
FIG. 7 is a flowchart representing operation of a vehicle in the mobile-body control system according to Embodiment 2.

Next, the operation of the mobile-body control system, configured as described above, according to Embodiment 2 will be explained. FIG. 7 is a flowchart representing operation of a vehicle in the mobile-body control system according to Embodiment 2; FIG. 7 represents the operation in a time period after the vehicle 10 has received a response message from the management apparatus 20.

In the step S201 in FIG. 7, the vehicle 10 receives a response message from the management apparatus 20, in response to a request message transmitted from the vehicle 10 to the management apparatus 20. Next, in the step S202, the vehicle 10 in the automatic-driving state obtains its own vehicle information from data obtained from a sensor or the like provided in the vehicle 10, the execution situation of a transfer instruction from the management apparatus 20, or the like; then, the step S202 is followed by the step S203.

In the step S203, because the response message received from the management apparatus 20 has the contents of instructing the transition to the waiting state, the waiting-place selection unit 104 selects the place where the vehicle 10 should wait. In the present embodiment, it is assumed that the reason why the request message has been transmitted is that the remaining charge amount of the battery is the same as or smaller than "20%", as indicated by the identification number ID1 in FIG. 4, and the waiting-place selection unit 104 selects, as a waiting place, a place such as a charging stand where charging facility exists. In the step S204, the waiting-place selection unit 104 not only selects the waiting place but also determines charging of the battery, as the operation during the waiting, and then notifies the worker for the vehicle 10 of a message urging execution of the charging operation.

Next, in the step S205, the vehicle 10 starts to move to the waiting place selected by the waiting-place selection unit

104. In the step S206, the waiting-place selection unit 104 determines whether or not the vehicle 10 has arrived at the waiting place; in the case where the vehicle 10 has arrived at the waiting place (Yes), the step S206 is followed by the step S207; in the case where the vehicle 10 has not arrived at the waiting place (No), the step S206 is resumed and then the processing in the step S206 is repeated.

In the step S207, the state-transition execution unit 103 makes the vehicle 10 move to the waiting state. Next, in the step S208, the worker for the vehicle 10 starts, for example, battery-charging work; then, the processing in FIG. 7 is ended.

In addition, in the mobile-body control system according to Embodiment 2, the vehicle 10 is provided with the waiting-place selection unit 104; however, it may be allowed that the management apparatus 20 is provided with the waiting-place selection unit 104. In the case where the management apparatus 20 is provided with the waiting-place selection unit 104, the management apparatus 20 that receives a request message from the vehicle 10 transmits a response message including a waiting place to the vehicle 10; thus, the vehicle 10 moves to the waiting place so that the transition to the waiting state is performed.

In the foregoing mobile-body control system according to Embodiment 2, after transition to the waiting state, the vehicle 10 moves to the waiting place selected by the waiting-place selection unit 104; therefore, operation in which loss in the battery is suppressed can be selected.

Although the present disclosure has described two embodiments, it should be understood that the various features, aspects and functions described in these embodiments can be applied not only to a specific embodiment but also to one or more of the embodiments, alone or in various combinations. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Next, the respective features of the mobile-body control systems disclosed in the present disclosure will be described as appendixes.

(Appendix 1) A mobile-body control system comprising:
a mobile body that is configured in such a way as to be able to travel through automatic driving; and
a management apparatus that controls the mobile body by mutually communicating with the mobile body,
wherein the management apparatus has an instruction unit that transmits to the mobile body a command for making the mobile body move to a waiting state from the automatic driving, via the communication,
wherein the mobile body has a storage unit that stores a condition for transition to the waiting state, a state-transition determination unit that determines whether or not the mobile body satisfies the condition, and a state-transition execution unit that makes the mobile body move to the waiting state, and
wherein in the case where the state-transition determination unit determines that a state of the mobile body satisfies the condition and the mobile body receives the command from the management apparatus via the communication, the state-transition execution unit makes the mobile body move to the waiting state.

(Appendix 2) The mobile-body control system according to Appendix 1,

wherein in the case where the state-transition determination unit determines that the condition is satisfied, the mobile body requests the management apparatus to transmit the command, and wherein based on the request from the mobile body, the management apparatus transmits the command to the mobile body via the communication.

(Appendix 3) A mobile-body control system comprising:

a mobile body that is configured in such a way as to be able to travel through automatic driving; and a management apparatus that controls the mobile body by mutually communicating with the mobile body, wherein the management apparatus has a communication unit inside the management apparatus and an instruction unit that is mutually communicatably connected with the communication unit inside the management apparatus via a communication path, wherein the mobile body has a communication unit inside the mobile body mutually communicatably connected with the communication unit in the management apparatus, a storage unit that stores a condition for the mobile body to move to a waiting state, a state-transition determination unit that determines whether or not the mobile body satisfies the condition, and a state-transition execution unit that makes the mobile body move to the waiting state, wherein the communication unit inside the mobile body, the storage unit, the state-transition determination unit, and the state-transition execution unit are communicatably connected with one another via a communication path, wherein when determining that a state of the mobile body satisfies the condition stored in the storage unit, the state-transition determination unit transmits to the management apparatus a request message for requesting transmission of a command of instructing transition to the waiting state, via the communication path inside the mobile body and the communication path inside the management apparatus, wherein in response to the request message, the instruction unit transmits a response message including the command to the mobile body, via the communication path inside the management apparatus and the communication path inside the mobile body, and wherein based on the command included in the response message, the state-transition execution unit makes the mobile body move to the waiting state.

(Appendix 4) The mobile-body control system according to any one of Appendix 1 through Appendix 3, wherein the mobile body has a waiting-place selection unit that selects a waiting place where the mobile body waits, and wherein the mobile body that has moved to the waiting state waits at a waiting place selected by the waiting-place selection unit.

(Appendix 5) The mobile-body control system according to any one of Appendix 1 through Appendix 3, wherein the management apparatus has a waiting-place selection unit that selects a waiting place where the mobile body waits, and wherein the mobile body that has moved to the waiting state waits at a waiting place selected by the waiting-place selection unit.

(Appendix 6) The mobile-body control system according to any one of Appendix 1 through Appendix 5, wherein in order to efficiently perform operation of the mobile body, the condition stored in the storage unit includes a condition for making the mobile body move to the waiting state.

(Appendix 7) The mobile-body control system according to any one of Appendix 1 through Appendix 6, wherein the storage unit stores the condition and an operation state of the mobile body.

(Appendix 8) The mobile-body control system according to any one of Appendix 1 through Appendix 7, wherein in the case where when being in the waiting state, the mobile body becomes not to satisfy the condition, the mobile body moves to another state from the waiting state.

(Appendix 9) The mobile-body control system according to any one of Appendix 1 through Appendix 8, wherein in a time period before moving to the waiting state, the mobile body keeps an operation state at a time before moving to the waiting state.

(Appendix 10) The mobile-body control system according to any one of Appendix 1 through Appendix 9, wherein in the waiting state, the mobile body performs operation of suppressing a function of a battery mounted in the mobile body from being lost.

DESCRIPTION OF REFERENCE NUMERALS

1: mobile-body control system, 10, 11: vehicle,
20: management apparatus, 30, 31, 32: communication path,
100, 200: communication unit, 101: storage unit,
102: state-transition determination unit,
103: state-transition execution unit,
104: waiting-place selection unit,
201: instruction unit, 1000: trailer head, 1001: trailer,
1002: coupling member,
1003, 1005: front-wheel unit
1004, 1006: rear-wheel unit
What is claimed is:

1. A mobile-body control system comprising:
a mobile body that is configured in such a way as to be able to travel through automatic driving; and
a management apparatus disposed outside the mobile body that controls the mobile body by mutually communicating with the mobile body,
wherein the management apparatus has an instruction device that transmits to the mobile body a command for making the mobile body move to a waiting state from the automatic driving, via the communication,
wherein the mobile body has a storage device that stores a condition for transition to the waiting state, a state-transition determination device that determines whether or not the mobile body satisfies the condition, and a state-transition execution device that makes the mobile body move to the waiting state,
wherein in the case where the state-transition determination device determines that a state of the mobile body satisfies the condition and the mobile body receives the command from the management apparatus via the communication, the state-transition execution device makes the mobile body move to the waiting state,
the waiting state is a state where functions other than communication with the management apparatus are stopped to suppress power consumption of a battery mounted in the mobile body.

2. The mobile-body control system according to claim 1, wherein in the case where the state-transition determination device determines that the condition is satisfied, the mobile body requests the management apparatus to transmit the command, and wherein based on the request from the mobile body, the management apparatus transmits the command to the mobile body via the communication.

3. The mobile-body control system according to claim 1, wherein the storage device stores the condition and an operation state that can be taken by the mobile body.

4. The mobile-body control system according to claim 1, wherein in the case where when being in the waiting state, the mobile body becomes not to satisfy the condition, the mobile body moves to another state from the waiting state.

5. The mobile-body control system according to claim 1, wherein in a time period before moving to the waiting state, the mobile body keeps an operation state at a time before moving to the waiting state.

6. The mobile-body control system according to claim 1, wherein in the waiting state, the mobile body performs operation of suppressing a function of a battery mounted in the mobile body from being lost.

7. A mobile-body control system comprising:

a mobile body that is configured in such a way as to be able to travel through automatic driving; and a management apparatus disposed outside the mobile body that controls the mobile body by mutually communicating with the mobile body, wherein the management apparatus has a communicator inside the management apparatus and an instruction device that is mutually communicatably connected with the communicator inside the management apparatus via a communication path, wherein the mobile body has a communicator inside the mobile body mutually communicatably connected with the communicator in the management apparatus, a storage device that stores a condition for the mobile body to move to a waiting state, a state-transition determination device that determines whether or not the mobile body satisfies the condition, and a state-transition execution device that makes the mobile body move to the waiting state, wherein the communicator inside the mobile body, the storage device, the state-transition determination device, and the state-transition execution device are communicatably connected with one another via a communication path, wherein when determining that a state of the mobile body satisfies the condition stored in the storage device, the state-transition determination device transmits to the management apparatus a request message for requesting transmission of a command of instructing transition to the waiting state, via the communication path inside the mobile body and the communication path inside the management apparatus, wherein in response to the request message, the instruction device transmits a response message including the command to the mobile body, via the communication path inside the management apparatus and the communication path inside the mobile body, and wherein based on the command included in the response message, the state-transition execution device makes the mobile body move to the waiting state, the waiting state is a state where functions other than communication with the management apparatus are stopped to suppress power consumption of a battery mounted in the mobile body.

8. The mobile-body control system according to claim 1, wherein the mobile body has a waiting-place selector that selects a waiting place where the mobile body waits, and wherein the mobile body that has moved to the waiting state waits at a waiting place selected by the waiting-place selector.

9. The mobile-body control system according to claim 8, wherein in order to efficiently perform operation of the mobile body, the condition stored in the storage device includes a condition for making the mobile body move to the waiting state.

10. The mobile-body control system according to claim 8, wherein the storage device stores the condition and an operation state that can be taken by the mobile body.

11. The mobile-body control system according to claim 8, wherein in the case where when being in the waiting state, the mobile body becomes not to satisfy the condition, the mobile body moves to another state from the waiting state.

12. The mobile-body control system according to claim 8, wherein in a time period before moving to the waiting state, the mobile body keeps an operation state at a time before moving to the waiting state.

13. The mobile-body control system according to claim 8, wherein in the waiting state, the mobile body performs operation of suppressing a function of a battery mounted in the mobile body from being lost.

14. The mobile-body control system according to claim 1, wherein the management apparatus has a waiting-place selector that selects a waiting place where the mobile body waits, and wherein the mobile body that has moved to the waiting state waits at a waiting place selected by the waiting-place selector.

15. The mobile-body control system according to claim 14, wherein in order to efficiently perform operation of the mobile body, the condition stored in the storage device includes a condition for making the mobile body move to the waiting state.

16. The mobile-body control system according to claim 14, wherein the storage device stores the condition and an operation state that can be taken by the mobile body.

17. The mobile-body control system according to claim 14, wherein in the case where when being in the waiting state, the mobile body becomes not to satisfy the condition, the mobile body moves to another state from the waiting state.

18. The mobile-body control system according to claim 14, wherein in a time period before moving to the waiting state, the mobile body keeps an operation state at a time before moving to the waiting state.

19. The mobile-body control system according to claim 14, wherein in the waiting state, the mobile body performs operation of suppressing a function of a battery mounted in the mobile body from being lost.

20. The mobile-body control system according to claim 1, wherein in order to efficiently perform operation of the mobile body, the condition stored in the storage device includes a condition for making the mobile body move to the waiting state.

* * * * *